(12) United States Patent
Chen et al.

(10) Patent No.: US 10,145,668 B2
(45) Date of Patent: Dec. 4, 2018

(54) FABRY-PEROT(F-P) SENSOR WITH SLIDING BLOCK HAVING INCLINED REFLECTIVE SURFACE

(71) Applicant: Yizheng Chen, Jilin (CN)

(72) Inventors: Yizheng Chen, Jilin (CN); Yan Tang, Jilin (CN); Yong Yuan, Jilin (CN); Yongji Wu, Jilin (CN); Xian Liu, Jilin (CN); Jie Huang, Jilin (CN); Jing Guo, Jilin (CN); Changlin Chen, Jilin (CN)

(73) Assignee: Yizheng Chen, Jilin (CN)

( * ) Notice: Subject to any disclaimer, the term of this patent is extended or adjusted under 35 U.S.C. 154(b) by 0 days.

(21) Appl. No.: 15/342,610

(22) Filed: Nov. 3, 2016

(65) Prior Publication Data
US 2017/0219333 A1     Aug. 3, 2017

(30) Foreign Application Priority Data

Jan. 29, 2016  (CN) .......................... 2016 1 0064409

(51) Int. Cl.
*G01B 9/02*       (2006.01)
*G01D 5/26*       (2006.01)

(52) U.S. Cl.
CPC ......... *G01B 9/02029* (2013.01); *G01D 5/266* (2013.01)

(58) Field of Classification Search
CPC ............ G01B 2290/25; G01B 9/02023; G01H 9/006; G01J 2009/0257; G01V 8/00
See application file for complete search history.

(56) References Cited

U.S. PATENT DOCUMENTS

| 5,565,987 | A | * | 10/1996 | Jain | ........................ G01B 7/34 356/501 |
|---|---|---|---|---|---|
| 5,891,747 | A | | 4/1999 | Farah | |
| 6,281,976 | B1 | | 8/2001 | Taylor et al. | |
| 6,687,011 | B1 | | 2/2004 | Lee et al. | |
| 7,134,346 | B2 | | 11/2006 | Lopushansky et al. | |
| 7,355,723 | B2 | | 4/2008 | Carr | |
| 7,492,463 | B2 | | 2/2009 | Lopushansky et al. | |

(Continued)

FOREIGN PATENT DOCUMENTS

| EP | 0101726 B1 | 1/1987 |
|---|---|---|
| EP | 0456681 B1 | 3/1994 |

*Primary Examiner* — Hwa Lee
(74) *Attorney, Agent, or Firm* — Gokalp Bayramoglu

(57) ABSTRACT

The present invention provides the Fabry-Perot (F-P) sensor compromising housing, measuring probe, longitudinal sling block, and displacement converting device. The optic fiber passes through upside sealing ring and extends into upside through hole with the optic fiber end surface disposed at the bottom; the upside of longitudinal sliding block is disposed with reflecting surface, thus a Fabry-Perot cavity is formed between part of the fiber end surface at the bottom of the fiber and the reflecting surface on the upside of longitudinal sliding block. The displacement converting device will convert the lateral slides of the measuring probe into the slides of the longitudinal sliding block, which thus changes the distance from the reflecting surface to the fiber end surface and changes the Fabry-Perot cavity length. Further, the sliding distance of the measuring probe can be calculated after the variation of the Fabry-Perot cavity length measured in according with the Fabry-Perot principle.

7 Claims, 7 Drawing Sheets

(56) References Cited

U.S. PATENT DOCUMENTS 7,495,775 B2 2/2009 Carr
7,551,295 B2 6/2009 Carr et al.
7,782,465 B2 8/2010 Gibler et al.

* cited by examiner

FABRY-PEROT(F-P) SENSOR WITH SLIDING BLOCK HAVING INCLINED REFLECTIVE SURFACE

TECHNICAL FIELD OF THE INVENTION

The invention relates to the field of sensors and more particularly, to A Fabry-Perot (F-P) sensor.

BACKGROUND OF THE INVENTION

EFPI sensors are mostly applied to measure pressure, strain or temperature. For instance, the EFPI employed in measuring distance is usually used for detecting the micro or nano displacement. However there are always large or small displacement such as exceeding 1 mm or 1 cm in practical structures. The sensors in the prior art for measuring large distance are most based on the electric principle, in which the potentiometer parts are used to convert the mechanical displacement to a resistance or voltage output according to their linear or nonlinear functional relation, and then deduce displacement through output signal. Therefore, these foregoing mentioned sensors for distance measurement are easily impacted by temperature or electromagnetic and thus the temperature compensate and anti-interference processing are necessary. But using optic fiber as the sensor can eliminate many disadvantages such as the effects from electromagnetic.

CONTENT OF THE INVENTION

In order to solve the foregoing technical problems, the invention provides A Fabry-Perot (F-P) sensor, wherein the present sensor comprises housing, measuring probe, longitudinal sliding block and displacement converting device. The optic fiber passing through the upside sealing ring extends into the upside through-hole, wherein the optic fiber end surface disposed at the bottom end of the optic fiber and the reflecting surface arranged on the upside of reflecting surface, thus a Fabry-Perot cavity is formed between the end surface of optic fiber and the reflecting surface on the upside of the longitudinal sliding block. The displacement converting device converts the lateral slide of measuring probe to the slide of the longitudinal sliding block, which can change the distance between the reflecting surface to the end surface of optic fiber, and thus change the Fabry-Perot cavity length. Then the variation of Fabry-Perot length can be measured according to the Fabry-Perot principle to calculate the sliding distance of the measuring probe. The sensor provided in present invention has advantages such as high precision, strong anti-interference and strong duration and has wide application prospective. Particularly, it is suitable for measuring structure's large distance and ambient temperature with high precision under static and dynamic force. In addition, present sensor can applied in condition with 40° C. below zero when adopting materials with stable performance.

In order to achieve the foregoing objects, the technical scheme of present invention is as follows.

The invention provides A Fabry-Perot (F-P) sensor comprising a housing, a displacement converting device, and an optic fiber, wherein:

the said housing is a tube body with an inner cavity passing through two ends, wherein a right sealing plug sealably connected to the housing is disposed at the right side of the housing;

the upside of the housing is arranged with an upside through-hole extending into the intracavity; the top of said upside through-hole is provided with an upside sealing ring which is sealably connected to the housing; the optic fiber passing through the upside sealing ring extends into the upside through-hole, and the bottom of the optic fiber has a fiber end surface;

the said displacement converting device compromising a measuring probe, a conversion body, and a longitudinal sliding block, wherein said measuring probe is connected to the left of the conversion body and the longitudinal sliding block is connected to the upside of the conversion body;

the left side of the housing is provided with the axial through-hole which is extending into the intracavity, and the vertical size of which is less than that of the intracavity; the measuring probe is matching with the axial through-hole and the left end of which passing through the axial through-hole and extending out from the left of the housing; a left sealing ring sealably connected to the housing is disposed at the left of the axial through-hole, wherein the measuring probe further extending out from the left sealing ring arranged at the left side of the through-hole.

A reflecting surface is disposed at the upside of the longitudinal sliding block, wherein the reflecting surface is normal to the axis of the optic fiber; the conversion body converts the lateral slide of the measuring probe to the longitudinal slide of the longitudinal sliding block, thus changes the distance from said reflecting surface to said end of optic fiber. The conversion body is located inside of the intracavity.

Preferably, when the lateral sliding distance of the measuring probe is x, the varying distance from said reflecting surface to said end of optic fiber is y, and y=ax, where, 0<a<1.

Preferably, said longitudinal sliding block is compatible with the upside through-hole and the upper end of which is inserted into the upside through-hole; the longitudinal sliding distance of the longitudinal sliding block is less than the vertical height of the upside through-hole.

Preferably, said axial through-hole is a horizontally arranged positive cylindrical surface of which roll balls are disposed on the inner surface; said upside through-hole is a vertically placed positive cylinder with roll balls provided on the inner surface.

Preferably, said inner surface of said axial through-hole is a cylindrical surface placed horizontally, wherein multiple rows' roll balls are uniformly arranged along the circumferential direction of the cylinder surface and each row has multiple roll balls arrayed along the plain line of the cylinder surface; the measuring probe compatible with the axial through-hole is a horizontally arranged cylinder, wherein the first sliding slot in conjunction with the multiple roll balls is disposed on the cylinder surface of the measuring probe;

wherein said inner surface of said upside through-hole is a vertically placed cylindrical surface, wherein multiple rows' roll balls are uniformly arranged along the circumferential direction of the cylinder and each row has multiple roll balls arrayed along the plain line of the cylinder surface; the longitudinal sliding block compatible with the upside thorough-hole is a vertically placed cylinder, wherein the second sliding slot in conjunction with the multiple roll balls is disposed on the cylindrical surface of the longitudinal sliding block.

Preferably, said optic fiber end surface is basically perpendicular to the axis of the fiber and the reflecting surface is parallel to the end surface of the optic fiber.

Preferably, said optic fiber is in series with fiber Bragg grating and the distance from the end of said fiber Bragg grating to the fiber end surface is 1 to 3 millimeters.

Preferably, the vertical dimension of the axial through-hole is less than that of the intracavity.

The measuring probe is fixedly connected to conversion body of which the upside is arranged with a sliding slot, wherein said sliding slot has an inclined angle of θ with central axis of the conversion body.

The longitudinal sliding block consists of fixedly connected upper sliding block and lower sliding block, wherein the horizontal dimension of the upper sliding block is less than that of the lower sliding block; the top of the upper sliding block arranged with the reflecting surface and the periphery of which provided with the vertically tensile spring; the vertically tensile spring is stuck by the external housing of the upside through-hole and the lower sliding block. The bottom of the lower sliding block is arranged with straight row needle roller which is compatibly installed in the slide slot.

A horizontal spring is also disposed at the right side of the conversion body, a right sealing plug is disposed at the right side of the housing, and the horizontal spring is between the conversion body and the right sealing plug; the horizontal spring exerts left elastic force on the displacement converting device and pops out it after the displacement converting device moving to the right.

Preferably, the outside of said upside through-hole is an embossment located at the upside of the housing and sealably connected to the housing.

Preferably, said conversion body is a horizontally placed wedge with a wedge surface faced up and a wedge angle of θ.

Preferably, the wedge angle of said conversion body is faced to the left.

Preferably, a disp-limit block is disposed between the measuring probe and the conversion body, and the vertical dimension of the disp-limit block is greater than that of the measuring probe.

Preferably, the right side of said conversion body is fixedly connected to a shaking resistant block, which is tightly fit in the intracavity, and said horizontal tensile spring is disposed at the right side of said shaking resistant block.

Preferably, the scope of the angle θ is 0°≤θ≤90°.

The invention provides A Fabry-Perot (F-P) sensor comprising a housing, a displacement converting device, and an optic fiber, wherein:

the housing is a tube body with an inner cavity passing through two ends, wherein an upside through-hole connected through the intracavity is disposed at the upper side of the housing, an upside sealing ring sealably connected to the housing is arranged at the upper side of the upside through hole, and a sealing ring through-hole connected through the upside through-hole is disposed on the upside sealing ring; the central axis of the sealing ring through-hole has a inclined angle of 90°−α with the central axis of the present sensor; the optic fiber passes through the sealing ring through-hole and the upside through-hole extends into the intracavity; the bottom of the optic fiber has an optic fiber end surface and the optic fiber is tightly jointed to the hole-wall of the sealing ring through-hole;

the left side of the housing is arranged with the axial through-hole, which is connected through the intracavity and of which the vertical size is less than that of the intracavity;

the said displacement converting device comprises measuring probe and right sliding block; wherein, the said measuring probe is fixedly linked to the right sliding block, compatible with the axial through-hole, and extends out from the left of the housing by passing through axial through-hole; the left sealing ring sealably jointed with the housing is disposed at the left side of the axial through-hole; the said measuring probe extends out from the left of the left sealing ring 16 arranged at the left of the axial through-hole; the top surface of the right sliding block is arranged with the reflecting surface which has an inclined angle of α with the neutral axis of the right sliding block and is perpendicular to the axis of the optic fiber;

a horizontal spring is also disposed at the right side of the right sliding block, a right sealing plug sealably connected to the housing is arranged at the right side of the housing, and the horizontal spring is between the right sliding block and the right sealing plug; the horizontal spring exerts left elastic force on the displacement converting device and pops out it after the displacement converting device moving to the right.

Preferably, said right sliding block is a horizontally arranged wedge with a wedge surface faced up and a wedge angel of α; said reflecting surface locates on the upper surface of the wedge.

Preferably, the wedge angle of said wedge faces to the left or right; regardless of the toward of wedge, the axis of optic fiber is always perpendicular to the reflecting surface.

Preferably, a disp-limit block is disposed between the measuring probe and the right sliding block, and the vertical size of the disp-limit block is greater than that of the axial through-hole.

Preferably, the right side of said conversion body is fixedly connected to a shaking resistant block, which is tightly fit in the intracavity, and said horizontal tensile spring is disposed at the right side of said shaking resistant block.

Preferably, said axial through-hole is a horizontally arranged positive cylindrical surface of which roll balls are disposed on the inner surface.

Preferably, said inner surface of said axial through-hole is a cylindrical surface placed horizontally, wherein multiple rows' roll balls are uniformly arranged along the circumferential direction of the cylinder surface and each row has multiple roll balls arrayed along the plain line of the cylinder surface; the measuring probe compatible with the axial through-hole is a horizontally arranged cylinder, wherein the first sliding slot in conjunction with the multiple roll balls is disposed on the cylinder surface of the measuring probe.

Preferably, said optic fiber end surface is basically perpendicular to the axis of the optic fiber and the reflecting surface is parallel to the end surface of the optic fiber.

Preferably, said optic fiber is in series with fiber Bragg grating and the distance from the end of said fiber Bragg grating to the fiber end surface is 1 to 3 millimeters.

Preferably, the scope of the angle α is 0°≤α≤90°.

The invention provides A Fabry-Perot (F-P) sensor comprising a housing, a displacement converting device, and an optic fiber, wherein:

the housing is a tube body with an inner cavity passing through two ends, wherein said intracavity is a horizontally placed cuboid; an upside through-hole connected through the intracavity is disposed at the upper side of the housing, an upside sealing ring sealably connected to the housing is arranged at the upper side of the upside through hole, and a sealing ring through-hole connected through the upside through-hole is disposed on the upside sealing ring; the central axis of the sealing ring through-hole has a inclined angle of 90°−β with the central axis of the present sensor; the optic fiber passes through the sealing ring through-hole and the upside through-hole extends into the intracavity; the bottom of the optic fiber has an optic fiber end surface and the optic fiber is tightly jointed to the hole-wall of the sealing ring through-hole;

the left side of the housing is arranged with the axial through-hole, which is connected through the intracavity and of which the vertical size is less than that of the intracavity; the axial through-hole is a horizontally arranged positive cylindrical surface of which roll balls are disposed on the inner surface;

said displacement converting device comprises measuring probe and right sliding block, wherein said measuring probe is fixedly linked to the right sliding block, compatible with the axial through-hole, and extends out from the left of the housing by passing through axial through-hole; the left sealing ring sealably jointed with the housing is disposed at the left side of the axial through-hole; the said measuring probe extends out from the left of the left sealing ring arranged at the left of the axial through-hole;

the right sliding block is a horizontally placed truncated cone, the slant of which has an inclined angle of β with the central axis of the right sliding block; a reflecting surface is disposed at the external surface of the truncated cone, wherein the slant of the reflecting surface has a inclined angle of β with the central axis of the right sliding block and is perpendicular to the axis of the optic fiber; a cylindrical block is fixed connected to the right of the right sliding block, wherein said cylindrical block is horizontally arranged cylinder and tightly fit in the intracavity; the central axis of the measuring probe, right sliding block and cylindrical block are in alignment;

a horizontal spring is also disposed at the right side of the cylindrical block, a right sealing plug sealably connected to the housing is arranged at the right side of the housing, and the horizontal spring 44 is between the right sliding block and the right sealing plug; the horizontal spring exerts left elastic force on the displacement converting device and pops out it after the displacement converting device moving to the right.

Preferably, a disp-limit block is disposed between the measuring probe and the right sliding block, and the vertical size of the disp-limit block is greater than that of the axial through-hole.

Preferably, said optic fiber end surface is basically perpendicular to the axis of the fiber and the reflecting surface is parallel to the end surface of the optic fiber.

Preferably, said optic fiber is in series with fiber Bragg grating and the distance from the end of said fiber Bragg grating to the fiber end surface is 1 to 3 millimeters.

Preferably, the scope of the angle β is 0°≤β≤90°.

Preferably, the bottom surface of said truncated cone faces to the right.

The invention provides A Fabry-Perot (F-P) sensor comprising a housing, a displacement converting device, and an optic fiber, wherein:

the housing is a tube body with an inner cavity passing through two ends, wherein an upside through-hole connected through the intracavity is disposed at the upper side of the housing, an upside sealing ring sealably connected to the housing is arranged at the upper side of the upside through hole, and a sealing ring through-hole connected through the upside through-hole is disposed on the upside sealing ring; the optic fiber passes through the sealing ring through-hole and the upside through-hole extends into the intracavity; the bottom of the optic fiber has an optic fiber end surface and the optic fiber is tightly jointed to the hole-wall of the sealing ring through-hole;

the left side of the housing is arranged with the axial through-hole, which is connected through the intracavity and of which the vertical size is less than that of the intracavity;

said displacement converting device comprises a measuring probe, a conversion body and a spiral gear, wherein said measuring probe is fixedly linked to the conversion body, is compatible with the axial through-hole, and extends out from the left of the housing by passing through axial through-hole; the left sealing ring sealably jointed with the housing is disposed at the left side of the axial through-hole; the said measuring probe extends out from the left of the left sealing ring arranged at the left of the axial through-hole;

one side surface of said conversion body is disposed with rack; the spiral gear consists of two fixed jointed upper and lower part, wherein the lower part is the gear matched with the rack and the upper part is a spiral inclined plane of which the upper side is provided with a reflecting surface which is normal to the axis of the optic fiber. The spiral gear is fixed on the housing through a central axis and revolves on the central axis;

a horizontal spring is also disposed at the right side of the conversion body, a right sealing ring sealably connected to the housing is arranged at the right side of the housing, and the horizontal spring is between the right sliding block and the right sealing ring; the horizontal spring exerts left elastic force on the displacement converting device and pops out it after the displacement converting device moving to the right.

Preferably, said central axis is a shaking resistant device with roll balls.

Preferably, a disp-limit block is disposed between the measuring probe and the conversion body, and the vertical size of the disp-limit block is greater than that of the measuring probe.

Preferably, the right side of said conversion body is fixedly connected to a shaking resistant block, which is tightly fit in the intracavity, and said horizontal tensile spring is disposed at the right side of said shaking resistant block.

Preferably, said axial through-hole is a horizontally arranged positive cylindrical surface of which roll balls are disposed on the inner surface.

Preferably, said inner surface of said axial through-hole is a cylindrical surface placed horizontally, wherein multiple rows' roll balls are uniformly arranged along the circumferential direction of the cylinder surface and each row has multiple roll balls arrayed along the plain line of the cylinder surface. The measuring probe compatible with the axial through-hole is a horizontally arranged cylinder, wherein the first sliding slot in conjunction with the multiple roll balls is disposed on the cylinder surface of the measuring probe.

Preferably, said optic fiber end surface is basically perpendicular to the axis of the fiber and the reflecting surface is parallel to the end surface of the optic fiber.

Preferably, said optic fiber is in series with fiber Bragg grating and the distance from the end of said fiber Bragg grating to the fiber end surface is 1 to 3 millimeters.

The beneficial effect of the present invention are as follows:

(1) The invention elegantly combines the principle of the EFPI and mechanical designing. The large distance can be transformed into the rather small variation of the cavity length by adopting simple EFPI structure. Thus the greatly precise displacement is obtained.

(2) The intracavity Fabry-Perot fiber sensor for measuring displacement or crack provided in present invention almost has no effect from temperature, completely has no electromagnetic interference, and has the advantage of being able to conduct the long-term monitoring at sites with large temperature difference and severe conditions, thus has very strong practicality.

(3) The intracavity fiber Fabry-Perot sensor for measuring displacement or crack provided in present invention has considerable high shaking shock prevention technology which can ensure that the interference cavity length does not change due to the shaking and vibration of the main rod.

(4) The impact of the temperature on the intracavity fiber Fabry-Perot sensor for measuring displacement or crack provided in present invention is too small to affect the measuring accuracy; Even when the temperature difference is quite big, the biggest impact on the displacement is less than one over one thousands of range.

(5) In the intracavity fiber Fabry-Perot sensor for measuring displacement or crack provided in present invention, If the requirement on the accuracy is extremely high, the measuring accuracy can be improved by utilizing temperature compensation which is realized through a FBG and the entire system is also a optic fiber which is convenient for analyzing the displacement and temperature from a spectrum (as shown in FIG. 6).

Figure 1:
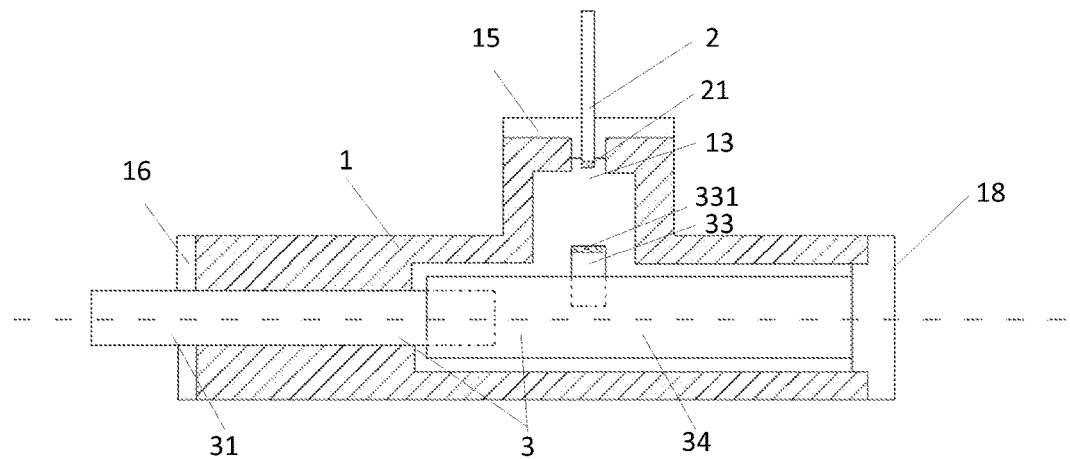
FIG. 1 is a front view of A Fabry-Perot (F-P) sensor provided in embodiment 1 of the invention.
Figure 2:
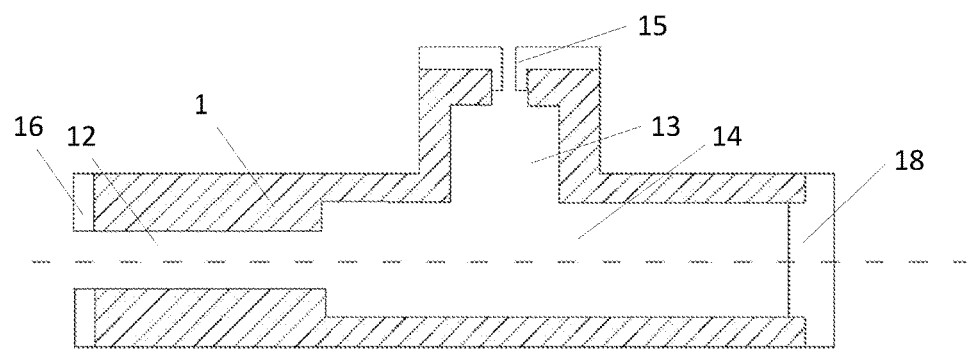
FIG. 2 is a front view of A Fabry-Perot (F-P) sensor provided in embodiment 1 of the invention.

Wherein: 1 is housing, 12 is axial through-hole, 13 is upside through-hole, 14 is intracavity, 15 is upside sealing ring, 151 is sealing ring through-hole, 16 is left sealing ring, 17 is roll balls, 18 is right sealing plug, 2 is optic fiber, 21 is partial reflecting surface, 3 is displacement converting device, 31 is measuring probe, 33 is longitudinal sliding block, 331 is reflecting surface, 332 is downside sliding block, 333 is vertically tensile spring, 334 is straight row roll needle, 335 is upside sliding block, 34 is conversion body, 341 is sliding slot, 342 is disp-limit block, 343 is shaking resistant block, 344 is cylindrical block, 35 is the first sliding slot, 36 is the second sliding slot, 44 is horizontally tensile spring, 61 is right sliding block, and 7 is central axis.

DETAILED DESCRIPTION OF THE PREFERRED EMBODIMENTS

Following the present invention is a step for further detailed description in conjunction with the detailed description of the embodiments.

In the description of the present invention, the orientation or position indicated by the terminologies of front, back, left, right, up, down, top and bottom and so on are based on the orientation or position showing in the accompanying drawing 1, which is only to facilitate the description of the present invention, not to require the present invention must be in a specific orientation structure and operation. Therefore, they cannot be interpreted as the limitation of the present invention.

Embodiment 1

A Fabry-Perot (F-P) sensor comprising a housing 1, a displacement converting device 3, and an optic fiber 2, wherein:

the said housing 1 is a tube body with an inner cavity 14 passing through two ends, wherein a right sealing plug 18 sealably connected to the housing 1 is disposed at the right side of the housing 1;

the upside of the housing 1 is arranged with an upside through-hole 13 extending into the intracavity 14; the top of said upside through-hole 13 is provided with an upside sealing ring 15 which is sealably connected to the housing 1; the optic fiber 2 passing through the upside sealing ring 15 extends into the upside through-hole 13, and the bottom of the optic fiber has a fiber end surface 21;

the said displacement converting device 3 comprising a measuring probe 31, a conversion body 34, and a longitudinal sliding block 33, wherein said measuring probe 31 is connected to the left of the conversion body 34 and the longitudinal sliding block 33 is connected to the upside of the conversion body 34;

the left side of the housing 1 is provided with an axial through-hole 12 which is extending into the intracavity 14, and the vertical size of which is less than that of the intracavity 14; the measuring probe 31 is matching with the axial through-hole 12, and the left end of which passing through the axial through-hole 12 and extending out from the left of the housing; a left sealing ring 16 sealably connected to the housing 1 is disposed at the left of the axial through-hole 12, wherein the measuring probe 31 further extending out from the left sealing ring arranged at the left side of the through-hole.

A reflecting surface 331 is disposed at the upside of the longitudinal sliding block 33, wherein the reflecting surface 331 is normal to the axis of the optic fiber 2; the conversion body converts the lateral slide of the measuring probe 31 to the longitudinal slide of the longitudinal sliding block 33, thus changes the distance from the reflecting surface 331 to the end of optic fiber 21; the conversion body 34 is located inside of the intracavity 14. The housing with two through ends is beneficial for placing the conversion device into the intracavity during production. Disposing sealing ring at left, right and upside of housing can prevent dusty and other particles entering into the intracavity of housing, which ensures the cleanness of intracavity, improves the measuring precision of the sensor and enlarges the application of the sensor.

The working principle of the intracavity fiber Fabry-Perot sensor for measuring displacement or crack provided in the present embodiment is as follows.

In present sensor, the optic fiber passes through upside sealing ring and extends into upside through hole 13 with the optic fiber end surface 21 disposed at the bottom; the upside of longitudinal sliding block is disposed with reflecting surface 331 which is also perpendicular to the axis of optic fiber, thus a Fabry-Perot cavity is formed between the fiber end surface at the bottom of the fiber and the reflecting surface on the upside of longitudinal sliding block. When the measuring probe slides distance of x, the conversion body will convert the distance x into the sliding of the longitudinal sliding block according to a certain law, thus the distance from reflecting surface to optic end surface can be changed of h=function(x), then the sliding amount h can be measured in accordance with Fabry-Perot principle and the lateral displacement x of measuring probe is able to be derived.

The present invention provides the intracavity fiber Fabry-Perot sensor for measuring displacement or crack compromising housing, measuring probe, longitudinal sling block, and displacement converting device. The optic fiber passes through upside sealing ring and extends into upside through hole with the optic fiber end surface disposed at the bottom; the upside of longitudinal sliding block is disposed with reflecting surface, thus a Fabry-Perot cavity is formed between part of the fiber end surface at the bottom of the fiber and the reflecting surface on the upside of longitudinal sliding block. The displacement converting device will convert the lateral slides of the measuring probe into the slides of the longitudinal sliding block, which thus changes the distance from the reflecting surface to the fiber end surface and changes the Fabry-Perot cavity length. Further, the sliding distance of the measuring probe can be calculated after the variation of the Fabry-Perot cavity length measured in accordance with the Fabry-Perot principle. The sensor provided in present invention has advantages such as high precision, strong anti-interference and strong duration and has wide application prospective. Particularly, it is suitable for measuring structure's large distance and ambient temperature with high precision under static and dynamic force. In addition, present sensor can applied in condition with 40° C. below zero when adopting materials with stable performance.

In practical use, if two directional displacements in a two dimensional plane XY wanted to be measured, a small steel frame can be utilized to arrange two mutually perpendicular sensor to simultaneously measure two displacement in the two dimensional plane. If three directional displacements in a three dimensional plane XYZ wanted to be measured, a small steel frame can also be utilized to install three mutually perpendicular sensor to simultaneously measure the three displacement.

Optionally, the said reflecting surface adopts the material which has good reflecting effect after polishing and is not easy oxidized.

Optionally, conversion body 34 is fixed in housing 1.

Optionally, the vertical dimension of conversion body 34 is less than that of the said intracavity.

Optionally, the distance between said optic fiber end surface 21 and reflecting surface 331 is 0.1 mm to 0.2 mm.

Preferably, when the lateral sliding distance of the measuring probe 31 is x, the varying distance from said reflecting surface 331 to said end of optic fiber 21 is y, and y=ax, where $0<a<1$.

When the distance variation y from reflecting surface to fiber end surface is proportional to the sliding distance x of the measuring probe, then y=ax and x=y/a, thus it is relatively easy to calculate the sliding distance x of measuring probe according to the change of distance y from reflecting surface to fiber end surface. Moreover, when $0<a<1$, and if x is a little larger, a relatively small y can be ensured, which means that the displacement converting device can convert the larger lateral displacement to shorter sliding distance of the longitudinal sling block; thus change the distance from reflecting surface to fiber end surface, facilitate the present sensor having the ability of measuring large distance and enlarge the application of the sensor.

Optionally, $0<a<0.1$.

Preferably, said longitudinal sliding block 33 is compatible with the upside through-hole 13 and the upper end of which is inserted into the upside through-hole 13; the longitudinal sliding distance of the longitudinal sliding block 33 is less than the vertical height of the upside through-hole 13.

Accordingly, the upside sealing ring provided at the top of the upside through-hole and the downside longitudinal sliding block compatible with the upside through-hole, makes the upside through-hole as an enclosed space, avoids the dusty and other particles entering into the upside through-hole, and improves the measuring accuracy, which allows the present sensor to be applied in some dusty and severe environments, and thus enlarges the serviceable range of the present sensor. The sliding distance of the longitudinal sliding block less than the vertical height of the upside through-hole, can eliminate the top of the longitudinal sliding block hit the bottom of the fiber, which further can prevent the sensor from damage and improve the service life of the present sensor.

Figure 3:
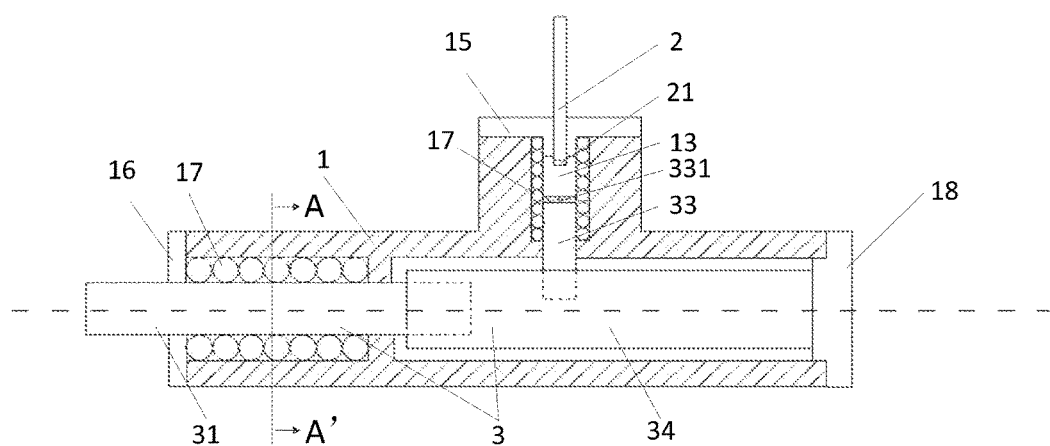
FIG. 3 is a front view of A Fabry-Perot (F-P) sensor provided in embodiment 1 of the invention.
Figure 4:
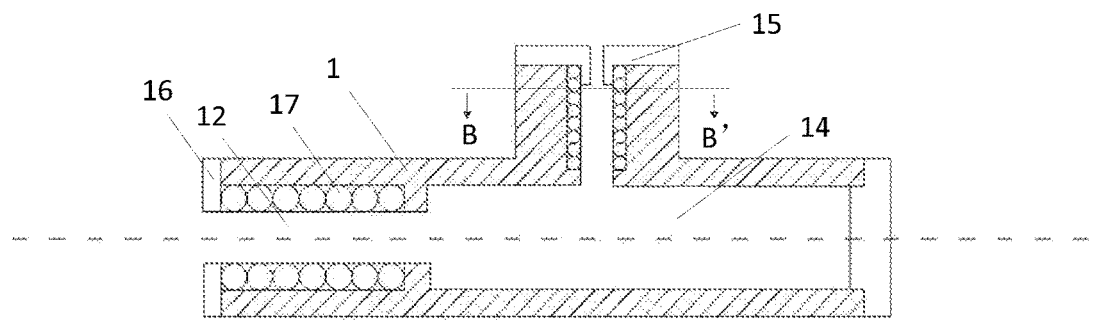
FIG. 4 is a front view of A Fabry-Perot (F-P) sensor provided in embodiment 1 of the invention.

Preferably, as shown in FIG. 3 and FIG. 4, said axial through-hole 12 is a horizontally arranged positive cylindrical surface of which roll balls 17 are disposed on the inner surface; said upside through-hole 13 is a vertically placed positive cylinder with roll balls 17 provided on the inner surface.

Arrangement of roll balls on the inner surface of the axial through-hole can facilitate the lateral sliding of the measuring probe. Arrangement of roll balls on the inner surface of the upside through-hole can facilitate the longitudinal sliding of the longitudinal sliding block.

Optionally, the said roll balls are the uniformly distributed multiple rows' roll balls.

Figure 5:
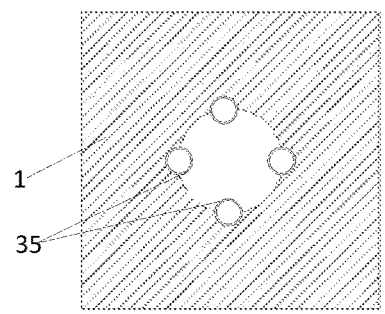
FIG. 5 is a profile along section AA of A Fabry-Perot (F-P) sensor provided in embodiment 1 of the invention.

Preferably, as shown in FIG. 5, said inner surface of said axial through-hole 12 is a cylindrical surface placed horizontally, wherein multiple rows' roll balls are uniformly arranged along the circumferential direction of the cylinder surface and each row has multiple roll balls 17 arrayed along the plain line of the cylinder surface; the measuring probe 31 compatible with the axial through-hole 12 is a horizontally arranged cylinder, wherein the first sliding slot 35 in conjunction with the multiple roll balls is disposed on the cylinder surface of the measuring probe 31.

Figure 6:
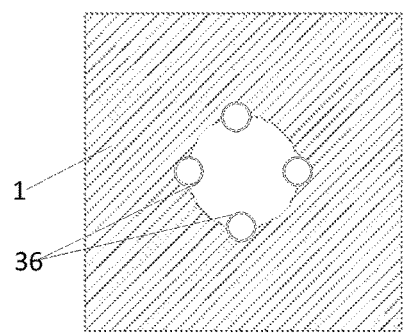
FIG. 6 is a profile along section BB of A Fabry-Perot (F-P) sensor provided in embodiment 1 of the invention.

As indicated in FIG. 6, the said inner surface of said upside through-hole 13 is a vertically placed cylindrical surface, wherein multiple rows' roll balls are uniformly arranged along the circumferential direction of the cylinder and each row has multiple roll balls 17 arrayed along the plain line of the cylinder surface; the longitudinal sliding block 33 compatible with the upside thorough-hole 13 is a vertically placed cylinder, wherein the second sliding slot 36 in conjunction with the multiple roll balls is disposed on the cylindrical surface of the longitudinal sliding block 33.

The roll balls are convenient for the sliding of the measuring probe; the first sliding slot compatible with the multiple rows' roll balls disposed on the cylindrical surface of the measuring probe is not only convenient for the axial sliding of the measuring probe, but also prevent the measuring probe's rotation along its central axis, and thus enhances the measurement accuracy of the present sensor.

Preferably, the said optic fiber 2 can be single or multimode.

Preferably, said optic fiber end surface 21 is basically perpendicular to the axis of the fiber 2 and the reflecting surface 331 is parallel to the end surface of the optic fiber 21.

Preferably, said optic fiber 2 is in series with fiber Bragg grating and the distance from the end of said fiber Bragg grating to the fiber end surface 21 is 1 to 3 millimeters.

A FBG in series can make the accuracy higher than one thousandth of the range, and realize the simultaneous monitoring of displacement and temperature without coupling relation and as independent parameters.

Preferably, a protection sleeve is provided on the external surface of optical fiber 2.

Optionally, the material of said housing 1 can be stainless steel.

Optionally, said housing 1 is horizontally placed hollow cylinder.

The intracavity fiber Fabry-Perot sensor for measuring displacement or crack provided in present invention compromises housing, measuring probe, and longitudinal sliding block; also, the measuring probe and longitudinal sliding block sealed in the housing avoids the pollution from dusty and improves the measuring accuracy. When the right pressure acted on the measuring probe leading to the right sliding of the measuring probe drives the sliding of the longitudinal sling block, the Fabry-Perot cavity length is changed and thus sliding distance of longitudinal sliding block is detected to calculate the sliding distance of the measuring probe.

Embodiment 2

Figure 7:
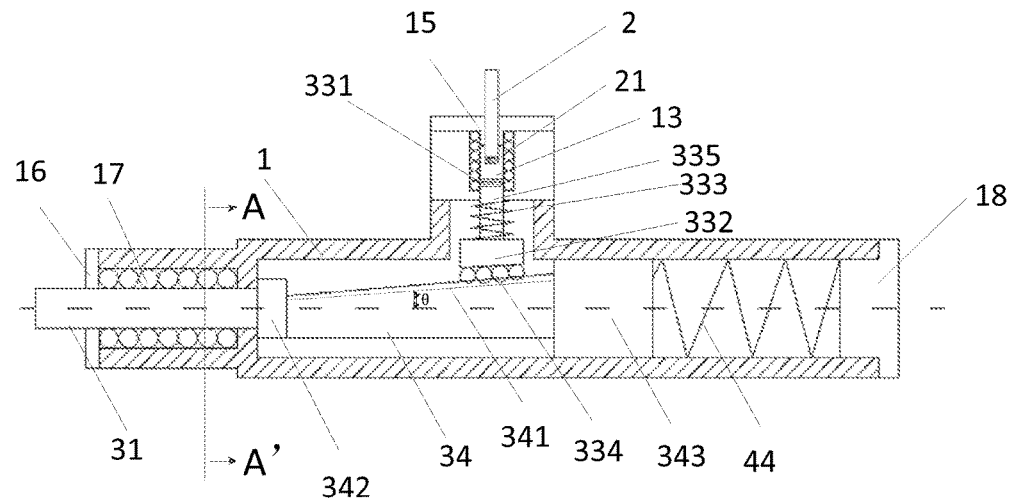
FIG. 7 is a front view of A Fabry-Perot (F-P) sensor provided in embodiment 2 of the invention.

The present embodiment has some improvements on the basis of embodiment 1, as shown in FIG. 7, the improved contents are as follows specifically:

The vertical dimension of the axial through-hole 12 is less than that of the intracavity 14; the measuring probe 31 is fixedly connected to conversion body 34 of which the upside is arranged with a sliding slot 341, wherein the sliding slot has a inclined angle of θ with central axis of the conversion body 34;

the longitudinal sliding block 33 consists of fixedly connected upper sliding block 335 and lower sliding block 332, wherein the horizontal dimension of the upper sliding block 335 is less than that of the lower sliding block 332; the top of the upper sliding block 335 arranged with the reflecting surface 331 and the periphery of which provided with the vertically tensile spring 333; the vertically tensile spring is stuck by the external housing of the upside through-hole 13 and the lower sliding block 332; the bottom of the lower sliding block is arranged with straight row needle roller 334 which is compatibly installed in the slide slot 341;

a horizontal spring 44 is also disposed at the right side of the conversion body 34, a right sealing plug 18 is disposed at the right side of the housing 1, and the horizontal spring 44 is between the conversion body 34 and the right sealing plug 18; the horizontal spring exerts left elastic force on the displacement converting device 3 and pops out it after the displacement converting device 3 moving to the right.

When the distance of measuring probe sliding to the right is w, due to the sliding slot disposed at the upside of the conversion body having an inclined angle θ with the central axis of the conversion body, the sliding distance of the longitudinal sliding block being driven to slide up and down is Δd=w tan θ, thus the Fabry-Perot cavity length is changed to measure the sliding distance of the longitudinal sliding block and the distance of the measuring probe sliding to the right is inferred as w=Δd/tan θ.

The conversion body can adopt high hard metal materials for fabrication. The sliding slot arranged at the upside of the conversion body can make the sliding of the longitudinal sliding block in sliding slot much better. Also as a result of the function of vertically tensile spring, the longitudinal sliding block is always pressed on the sliding slot without any looseness.

The horizontally tensile spring can resist the conversion body from the left to prevent the lateral shaking of the conversion body. Thus the shaking of the conversion body can be eliminated in practical application and the accuracy of the sensor is improved.

Optionally, the central axis of the measuring probe is parallel that of the conversion body.

Optionally, the vertical size of said conversion body 34 is less than that of the intracavity 14.

Preferably, the outside of said upside through-hole 13 is an embossment located at the upside of the housing and sealably connected to the housing 1.

The outside of the upside through-hole is an embossment located at the upside of housing, which can provide a larger space for the longitudinal sliding block.

Optionally, the said embossment is sealably connected or disconnected to the housing 1.

The disconnection between embossment and housing is beneficial for more easily putting the longitudinal sliding block into the intracavity during producing the sensor.

Preferably, said conversion body 34 is a horizontally placed wedge with a wedge surface faced up and a wedge angle of θ.

Preferably, the wedge angle of said conversion body 34 faces to the left.

Thus when the measuring probe slides to the right, the longitudinal can slide down to enlarge the Fabry-Perot cavity length.

Optionally, the wedge angle of said right sliding block 42 faces to the right.

Thus when the measuring probe slides to the right, the longitudinal can slide up to reduce the Fabry-Perot cavity length.

Preferably, a disp-limit block 342 is disposed between the measuring probe 31 and the conversion body 34, and the vertical dimension of the disp-limit block 342 is greater than that of the measuring probe 31.

Disposing the disp-limit block can prevent the measuring probe sliding to left and thus ensure the integrity of the present sensor as well as the improvement of the accuracy of the sensor.

Optionally, the central axis of the measuring probe, conversion body and disp-limit block are parallel.

Optionally, said disp-limit block 342 is a square block.

Optionally, said disp-limit block 342 is a ring.

The right side of said conversion body 34 is fixedly connected to a shaking resistant block 343, which is tightly fit in the intracavity 14, and said horizontal spring 44 is disposed at the right side of said shaking resistant block 343.

The shaking resistant block tightly fit in intracavity can avoid the shaking of the measuring probe along its central axis and further improve the precision of the present sensor.

Optionally, the axis of the measuring probe, conversion body, disp-limit block and shaking resistant block are parallel.

Optionally, said intracavity 14 is the horizontally placed cuboid, and the right side of said conversion body 34 is fixedly connected to a shaking resistant block 343 in horizontal arrangement, which is tightly fit in the intracavity 14, and said horizontal spring 44 is disposed at the right side of said shaking resistant block 343.

Preferably, the scope of the angle θ is 0°≤θ≤90°.

On the basis of the interference cavity being measured, the greater the inclined angle, the less the impact from the vibration and temperature on displacement.

In present embodiment, the combination of measuring probe and conversion body and longitudinal sliding block may shake. During the invention of the sensor, according to that even an extremely small shake would lead to a significant variation of the spectrum, it is discovered that there is almost no change of the spectrum by fixing the measuring probe without displacement, then manually shaking the measuring probe left and right or up and down to check whether the spectrum would change by observing the optic fiber. The scheme provided in the present embodiment has advantages such as convenient possessing, high accuracy, and convenient replacement of parts, strong shaking resistance and simple materials. But the sliding slot should better have the high processing accuracy.

Embodiment 3

Figure 8:
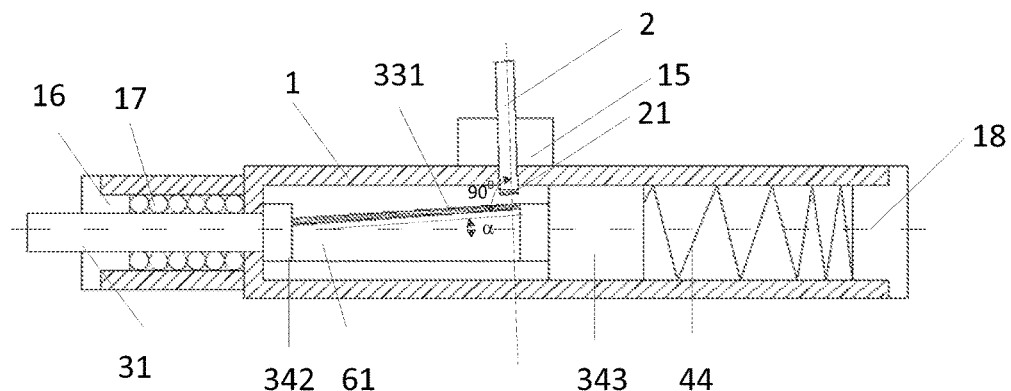
FIG. 8 is a front view of A Fabry-Perot (F-P) sensor provided in embodiment 3 of the invention.
Figure 9:
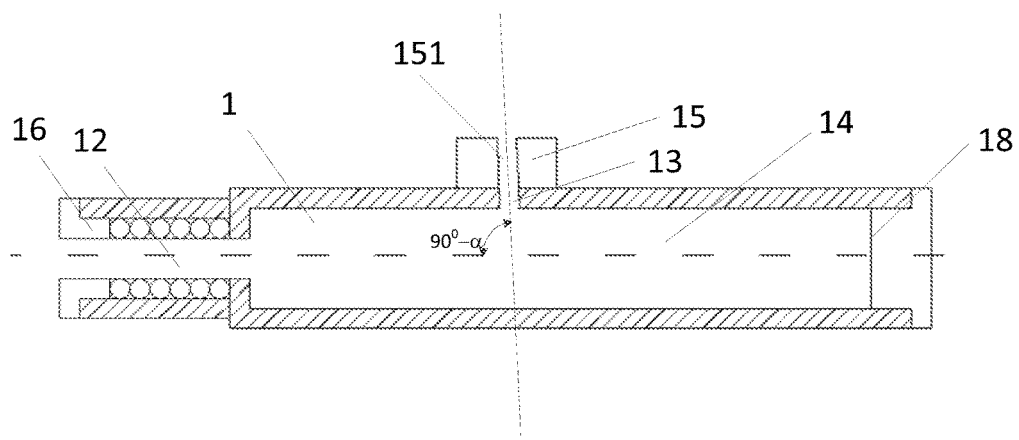
FIG. 9 is a front view of A Fabry-Perot (F-P) sensor provided in embodiment 3 of the invention.

As shown in FIG. 8 and FIG. 9, the present embodiment provides A Fabry-Perot (F-P) sensor comprising a housing 1, a displacement converting device 3, and an optic fiber 2, as shown in FIG. 8 and FIG. 9, wherein, the housing 1 is a tube body with an inner cavity 14 passing through two ends, wherein an upside through-hole 13 connected through the intracavity 14 is disposed at the upper side of the housing, an upside sealing ring 15 sealably connected to the housing 1 is arranged at the upper side of the upside through hole 13, and a sealing ring through-hole 151 connected through the upside through-hole 13 is disposed on the upside sealing ring 15; the central axis of the sealing ring through-hole 151 has a inclined angle of 90°−α with the central axis of the present sensor; the optic fiber 2 passes through the sealing ring through-hole 151 and the upside through-hole 13 extends into the intracavity; the bottom of the optic fiber 2 has an optic fiber end surface 21 and the optic fiber 2 is tightly jointed to the hole-wall of the sealing ring through-hole 151;

the left side of the housing 1 is arranged with the axial through-hole 12, which is connected through the intracavity 14 and of which the vertical size is less than that of the intracavity 14;

the said displacement conversion device 3 comprises measuring probe 31 and right sliding block 61; wherein, the said measuring probe 31 is fixedly linked to the right sliding block 61, is compatible with the axial through-hole 12, and extends out from the left of the housing 1 by passing through the axial through-hole 12; the left sealing ring 16 sealably jointed with the housing 1 is disposed at the left side of the axial through-hole 12; the said measuring probe 31 extends out from the left of the left sealing ring 16 arranged at the left of the axial through-hole 12; the top surface of the right sliding block 61 is arranged with the reflecting surface 331 which has an inclined angle of α with the neutral axis of the right sliding block 61 and is perpendicular to the axis of the optic fiber 2;

a horizontal spring 44 is also disposed at the right side of the right sliding block 61, a right sealing plug 18 sealably connected to the housing 1 is arranged at the right side of the housing 1, and the horizontal spring 44 is between the right sliding block 61 and the right sealing plug 18; the horizontal spring exerts left elastic force on the displacement converting device 3 and pops out it after the displacement converting device 3 moving to the right.

The working principle of the intracavity fiber Fabry-Perot sensor for measuring displacement or crack provided in the present embodiment as follows.

In present sensor, the optic fiber passes through upside sealing ring and extends into upside through-hole with the optic fiber end surface disposed at the bottom; the upside of right sliding block is disposed with reflecting surface which has an inclined angle α with the central axis of the right sliding block and perpendicular to the axis of the fiber, thus a Fabry-Perot cavity is formed between the fiber end surface at the bottom of the fiber and the reflecting surface on the upside of right sliding block. When the measuring probe sliding to the right with a distance w, the distance between the partial reflecting end surface and the reflecting surface is changed and the variation of the Fabry-Perot cavity length is Δd, thus the distance of the measuring probe sliding to right can be driven as w=Δd/sin α.

During the right sliding of the measuring probe and right sliding block, the reflecting spot is constantly changing; therefore, the reflective effect of the entire reflecting surface should be quite good and the slope of each spot should be highly consistent.

Optionally, the central axis of the measuring probe is parallel that of right sliding block.

Preferably, said right sliding block 61 is a horizontally arranged wedge with a wedge surface faced up and a wedge angel of α; said reflecting surface 331 is located on the upper surface of the wedge.

Preferably, the wedge angle of said wedge is faced to the left.

Thus when the measuring probe slides to the right, the Fabry-Perot cavity length can be enlarged.

Optionally, the wedge angle of said wedge is faced to the right.

Thus when the measuring probe slides to the right, the Fabry-Perot cavity length can be reduced.

Preferably, a disp-limit block 342 is disposed between the measuring probe 31 and the right sliding block 61, and the vertical dimension of the disp-limit block 342 is greater than that of the measuring probe 31.

Optionally, the central axis of the measuring probe, conversion body and disp-limit block are parallel.

Optionally, said disp-limit block 342 is a square.

Optionally, said disp-limit block 342 is a ring.

Preferably, the right side of said right sliding block 61 is fixedly connected to a shaking resistant block 343, which is tightly fit in the intracavity 14, and said horizontal spring 44 is disposed at the right side of said shaking resistant block 343.

Optionally, the axis of the measuring probe, conversion body, disp-limit block and shaking resistant block are parallel.

Optionally, said intracavity 14 is the horizontally placed cuboid, and the right side of said conversion body 34 is fixedly connected to a shaking resistant block 343 in horizontal arrangement, which is tightly fit in the intracavity 14, and said horizontal spring 44 is disposed at the right side of said shaking resistant block 343.

Preferably, the said axial through-hole 12 is a horizontally arranged positive cylindrical surface of which roll balls 17 are disposed on the inner surface.

Preferably, the said inner surface of said axial through-hole 12 is a cylindrical surface placed horizontally, wherein multiple rows' roll balls are uniformly arranged along the circumferential direction of the cylinder surface and each row has multiple roll balls 17 arrayed along the plain line of the cylinder surface. The measuring probe 31 compatible with the axial through-hole 12 is a horizontally arranged cylinder, wherein the first sliding slot 35 in conjunction with the multiple roll balls is disposed on the cylinder surface of the measuring probe 31.

Preferably, the said optic fiber end surface 21 is basically perpendicular to the axis of the fiber 2 and the reflecting surface 331 is parallel to the end surface of the optic fiber 21.

Preferably, the said optic fiber 2 is in series with fiber Bragg grating and the distance from the end of said fiber Bragg grating to the fiber end surface is 1 to 3 millimeters.

Preferably, the scope of the angle α α is $0°≤α≤90°$.

In present embodiment, the combination of the measuring probe and the right sliding block may shake. During the practical invention of the sensor, it is figured out that as long as the combination is accurately processed, the shaking can be eliminated and thus improve the sealing of the present sensor. The scheme provided in the present embodiment has advantages such as high accuracy and convenient replacement of parts. However, the reflecting surface should have the higher processing accuracy, keep smooth and adopt the material with good reflective effect. The sensor provided in the present embodiment has long service of life up to more than ten years according to the practical experience of the inventor.

Embodiment 4

Figure 10:
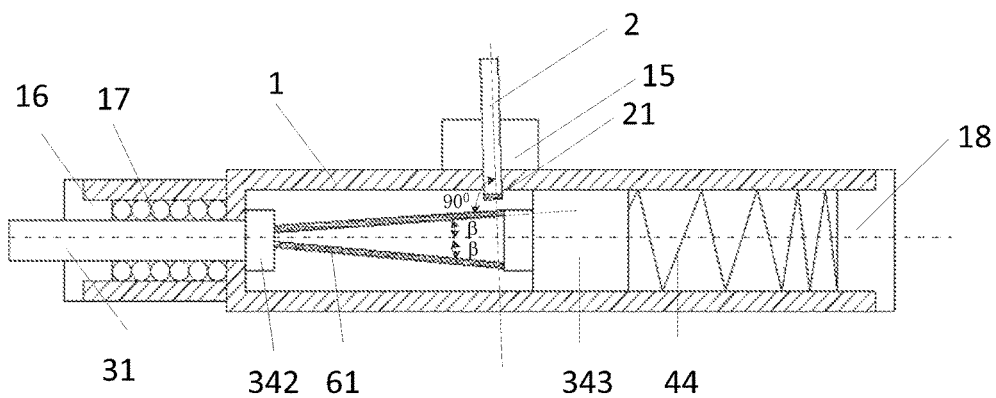
FIG. 10 is a front view of housing of A Fabry-Perot (F-P) sensor provided in embodiment 4 of the invention.
Figure 11:
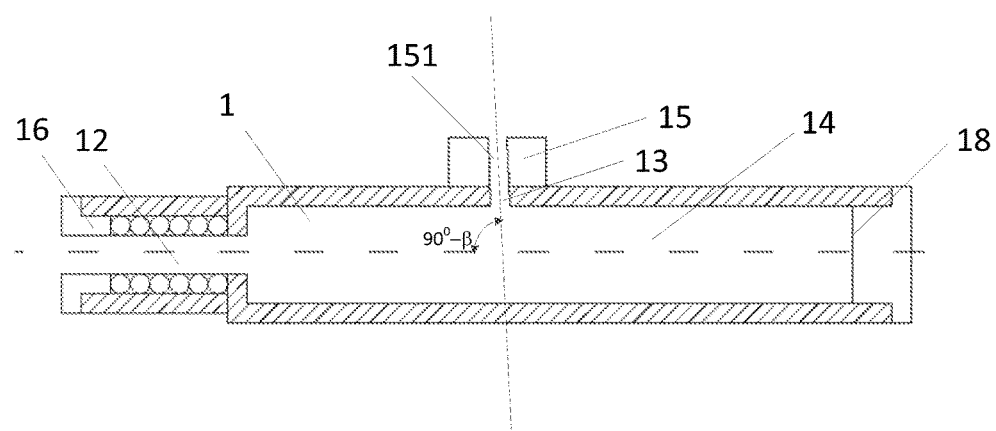
FIG. 11 is a front view of A Fabry-Perot (F-P) sensor provided in embodiment 5 of the invention.

As shown in FIG. 10 and FIG. 11, the present embodiment provides A Fabry-Perot (F-P) sensor comprising a housing 1, a displacement converting device 3, and an optic fiber 2, wherein, the housing 1 is a tube body with an inner cavity 14 passing through two ends, wherein said intracavity 14 is a horizontally placed cuboid; an upside through-hole 13 connected through the intracavity 14 is disposed at the upper side of the housing, an upside sealing ring 15 sealably connected to the housing 1 is arranged at the upper side of the upside through hole 13, and a sealing ring through-hole 151 connected through the upside through-hole 13 is disposed on the upside sealing ring 15; the central axis of the sealing ring through-hole 151 has a inclined angle of 90°−β with the central axis of the present sensor; the optic fiber 2 passes through the sealing ring through-hole 151 and the upside through-hole 13 extends into the intracavity; the bottom of the optic fiber 2 has an optic fiber end surface 21 and the optic fiber 2 is tightly jointed to the hole-wall of the sealing ring through-hole 151;

the left side of the housing 1 is arranged with the axial through-hole 12, which is connected through the intracavity 14 and of which the vertical size is less than that of the intracavity; the axial through-hole 12 is a horizontally arranged positive cylindrical surface of which roll balls 17 are disposed on the inner surface;

said displacement converting device 3 comprises measuring probe 31 and right sliding block 61, wherein said measuring probe 31 is fixedly linked to the right sliding block 61, is compatible with the axial through-hole 12, and extends out from the left of the housing 1 by passing through axial through-hole 12; the left sealing ring 16 sealably jointed with the housing 1 is disposed at the left side of the axial through-hole 12; the said measuring probe 31 extends out from the left of the left sealing ring 16 arranged at the left of the axial through-hole 12;

the right sliding block 61 is a horizontally placed truncated cone, the slant of which has an inclined angle of β with the central axis of the right sliding block 61; a reflecting surface 331 is disposed at the external surface of the truncated cone, wherein the slant of the reflecting surface 331 has a inclined angle of β with the central axis of the right sliding block 61 and is perpendicular to the axis of the optic fiber 2; a cylindrical block 343 is fixed connected to the right of the right sliding block, wherein said cylindrical block 343 is horizontally arranged cylinder and tightly fit in the intracavity 14; the central axis of the measuring probe 31, right sliding block 61 and cylindrical block 343 are in alignment;

a horizontal spring 44 is also disposed at the right side of the cylindrical block 343, a right sealing plug 18 sealably connected to the housing 1 is arranged at the right side of the housing 1, and the horizontal spring 44 is between the right sliding block 61 and the right sealing plug 18; the horizontal spring exerts left elastic force on the displacement converting device 3 and pops out it after the displacement converting device 3 moving to the right.

The right sliding block is the horizontally placed truncated cone, both the measuring probe and cylindrical block are the cylinder in horizontal arrangement and their central axis are parallel; thereby the rotation of the measuring probe would not affect the spectrum, thus the measuring probe and the conversion body can rotate along its central axis, which is convenient for the installation of the sensor and the utilization of the sensor in practical application.

The side surface of the truncated cone can adopt rotary polish to ensure the reflective performance for each point. In addition, the best is that any circular section of the cone is an exact circle and the circle are the points on the main rod.

Preferably, a disp-limit block 342 is disposed between the measuring probe 31 and the right sliding block 61, and the vertical size of the disp-limit block 342 is greater than that of the axial through-hole 12.

Preferably, the said optic fiber end surface 21 is basically perpendicular to the axis of the fiber 2 and the reflecting surface 331 is parallel to the end surface of the optic fiber 21.

Preferably, the said optic fiber 2 is in series with fiber Bragg grating and the distance from the end of said fiber Bragg grating to the fiber end surface is 1 to 3 millimeters.

Preferably, the scope of the angle β is $0°≤β≤90°$.

Preferably, the bottom surface of said truncated cone faces to the right

Thus when the measuring probe slides to the right, the Fabry-Perot cavity length can be enlarged.

Optionally, the bottom surface of said truncated cone faces to the left.

Thus when the measuring probe slides to the right, the Fabry-Perot cavity length can be reduced.

Embodiment 5

Figure 12:
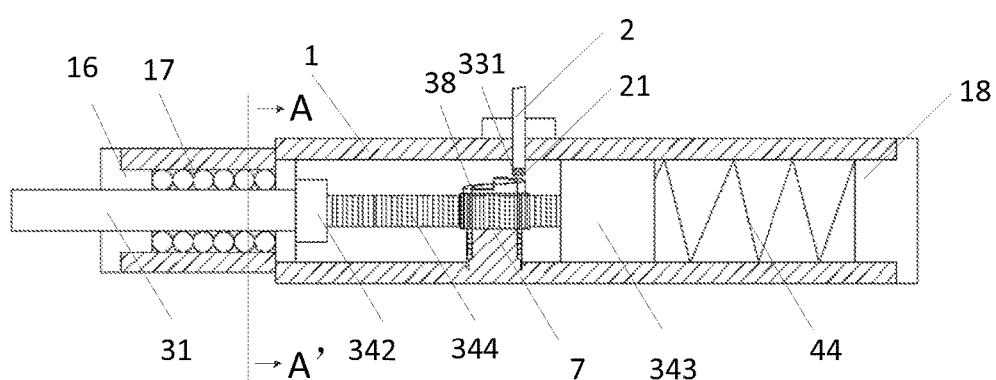
FIG. 12 is a front view of housing of A Fabry-Perot (F-P) sensor provided in embodiment 5 of the invention.
Figure 13:
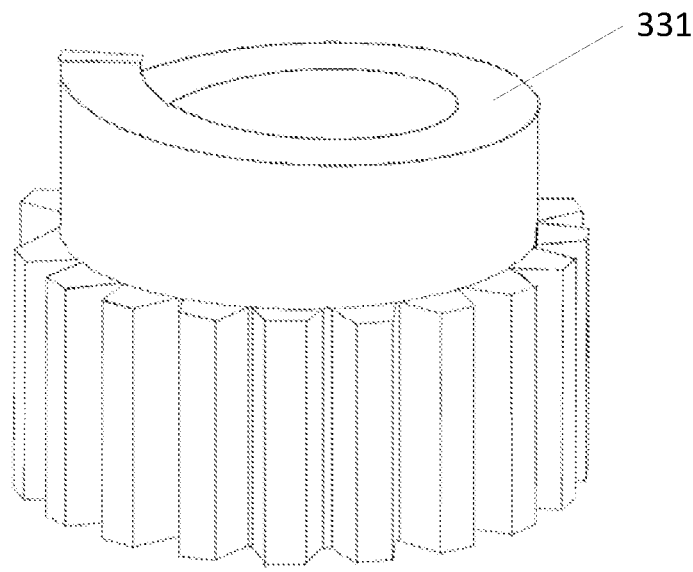
FIG. 13 is a stereogram of spiral gear of A Fabry-Perot (F-P) sensor provided in embodiment 5 of the invention.
Figure 14:
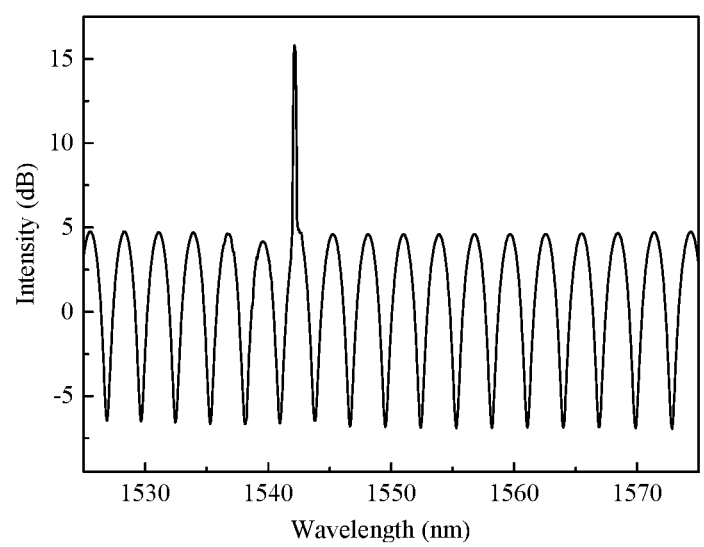
FIG. 14 is a spectrum of an extra FBG temperature sensor of A Fabry-Perot (F-P) sensor provided in embodiment 2 of the invention.
Figure 15:
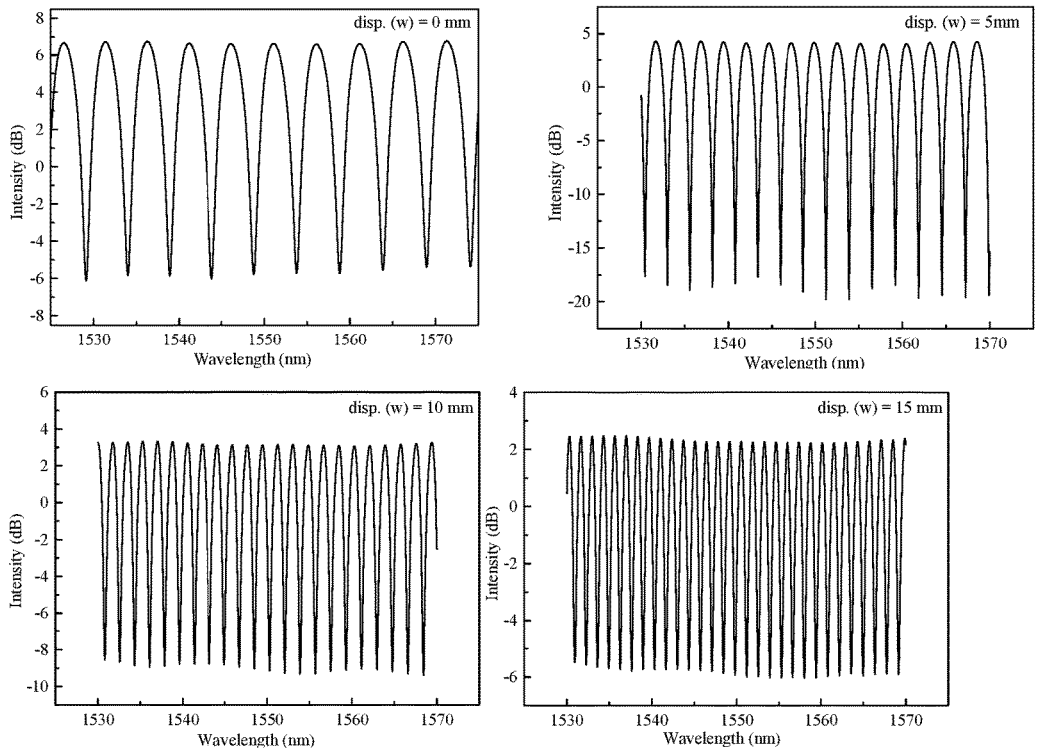
FIG. 15 is the spectrum in four different displacement of A Fabry-Perot (F-P) sensor with range of 2 cm provided in embodiment 2 of the invention.
Figure 16:
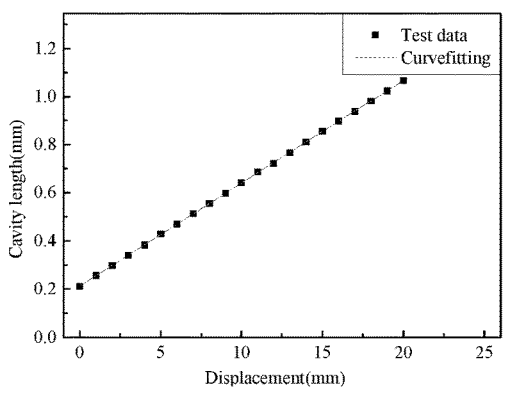
FIG. 16 is the relationship between calculated and measured displacement of A Fabry-Perot (F-P) sensor provided in embodiment 2 of the invention; the calculated displacement is computed from the cavity length at constant temperature 20° C. and 2 cm range of the present sensor; the measured displacement is measured from the present displacement sensor.
Figure 17:
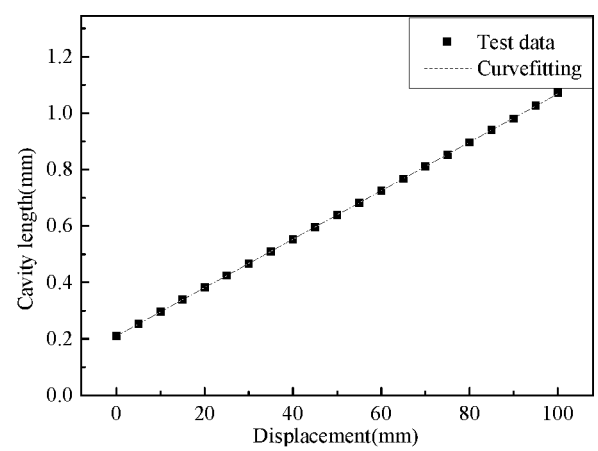
FIG. 17 is the relationship between calculated and measured displacement of A Fabry-Perot (F-P) sensor provided in embodiment 2 of the invention; wherein the calculated displacement is computed from the cavity length at constant temperature 20° C. and 10 cm range of the present sensor; the measured displacement is measured from the present displacement sensor.

As shown in FIG. 12 and FIG. 13, the present embodiment provides A Fabry-Perot (F-P) sensor comprising a housing 1, a displacement converting device 3, and an optic fiber 2, wherein, the housing 1 is a tube body with an inner cavity 14 passing through two ends, wherein an upside through-hole 13 connected through the intracavity 14 is disposed at the upper side of the housing, an upside sealing ring 15 sealably connected to the housing 1 is arranged at the upper side of the upside through hole 13, and a sealing ring through-hole 151 connected through the upside through-hole 13 is disposed on the upside sealing ring 15; the optic fiber 2 passes through the sealing ring through-hole 151 and the upside through-hole 13 extends into the intracavity; the bottom of the optic fiber 2 has an optic fiber end surface 21 and the optic fiber 2 is tightly jointed to the hole-wall of the sealing ring through-hole 151;

the left side of the housing 1 is arranged with the axial through-hole 12, which is connected through the intracavity 14 and of which the vertical size is less than that of the intracavity;

the displacement converting device 3 comprises a measuring probe 31, a conversion body 34 and a spiral gear 38, wherein said measuring probe 31 is fixedly linked to the conversion body 34, is compatible with the axial through-hole 12, and extends out from the left of the housing 1 by passing through axial through-hole 12; the left sealing ring 16 sealably jointed with the housing 1 is disposed at the left side of the axial through-hole 12; the said measuring probe 31 extends out from the left of the left sealing ring 16 arranged at the left of the axial through-hole 12;

one side surface of said conversion body 34 is disposed with rack 344; the spiral gear 38 consists of two fixedly jointed upper and lower part, wherein the lower part is the gear matched with the rack 344 and the upper part is a spiral inclined plane of which the upper side is provided with a reflecting surface 331 which is normal to the axis of the optic fiber 2; the spiral gear 38 is fixed on the housing 1 through a central axis 7 and revolves on the central axis 7;

a horizontal spring 44 is also disposed at the right side of the conversion body 34, a right sealing ring 18 sealably connected to the housing 1 is arranged at the right side of the housing 1, and the horizontal spring 44 is between the right sliding block 61 and the right sealing ring 18; the horizontal spring exerts left elastic force on the displacement converting device 3 and pops out it after the displacement converting device 3 moving to the right.

The working principle of the intracavity fiber Fabry-Perot sensor for measuring displacement or crack provided in the present embodiment is as follows.

When the measuring probe slides to the right, the rack would be driven to move to the right, which will make the spiral gear rotate along its central axis and thus drive the spiral inclined plane rotate along the central axis. The reflecting surface disposed at the upside of the spiral inclined plane is perpendicular to the axis of the optic fiber. Further, the length of the Fabry-Perot cavity formed between the fiber end surface of the optic fiber and the reflecting surface at the upside of the spiral inclined plane is changed. Thereby, the rather larger lateral displacement is transformed to pretty small variation of the interference cavity length by reducing the displacement through spiral inclined plane. Therefore, after the variation of the cavity length measured in accordance with the Fabry-Perot principle, the sliding distance to the right of the measuring probe can be calculated.

Optionally, the central axis of the measuring probe and the conversion body are parallel.

Preferably, the said central axis 7 is a shaking resistant device with roll balls.

The scheme provided in present embodiment is quite skillful that transforming the horizontal displacement of the measuring probe to the rotation of the gear and converting the rotation to the variation of the interference cavity length though a spiral reflecting surface on the gear, facilitates the entire system highly improve the accuracy by only a gear.

Preferably, a disp-limit block 342 is disposed between the measuring probe 31 and the conversion body, and the vertical size of the disp-limit block 342 is greater than that of the measuring probe 31.

Optionally, the central axis of the measuring probe, the conversion body and the disp-limit block are parallel.

Optionally, said disp-limit block 342 is a square.

Optionally, said disp-limit block 342 is a ring.

Preferably, the right side of said conversion body 34 is fixedly connected to a shaking resistant block 343, which is tightly fit in the intracavity 14, and said horizontal spring 44 is disposed at the right side of said shaking resistant block 343.

Optionally, the axis of the measuring probe, conversion body, disp-limit block and shaking resistant block are parallel.

Optionally, said intracavity 14 is the horizontally placed cuboid, and the right side of said conversion body 34 is fixedly connected to a shaking resistant block 343 in horizontal arrangement, which is tightly fit in the intracavity 14, and said horizontal spring 44 is disposed at the right side of said shaking resistant block 343.

Preferably, the said axial through-hole 12 is a horizontally arranged positive cylindrical surface of which roll balls 17 are disposed on the inner surface.

Preferably, the said inner surface of said axial through-hole 12 is a cylindrical surface placed horizontally, wherein multiple rows' roll balls are uniformly arranged along the circumferential direction of the cylinder surface and each row has multiple roll balls 17 arrayed along the plain line of the cylinder surface. The measuring probe 31 compatible with the axial through-hole 12 is a horizontally arranged cylinder, wherein the first sliding slot 35 in conjunction with the multiple roll balls is disposed on the cylinder surface of the measuring probe 31.

Preferably, the said optic fiber end surface 21 is basically perpendicular to the axis of the fiber 2 and the reflecting surface 331 is parallel to the end surface of the optic fiber 21.

Preferably, said optic fiber 2 is in series with fiber Bragg grating and the distance from the end of said fiber Bragg grating to the fiber end surface is 1 to 3 millimeters.

Obviously, the above said embodiments are only the examples for clearly illustrating the present sensor, not the limit to the embodiments. For those of ordinary skill in the art, the variations in different styles can be made on the basis of the said illustration. Herein, it is not necessary to describe all of the embodiment. However, the obvious variations extended from the present illustration are also been protected in this invention.

The invention claimed is:

1. A Fabry-Perot sensor comprising a housing, a displacement converting device, and an optic fiber, wherein the housing is a tube body with an intracavity, wherein an upside through-hole is disposed at an upper side of the housing, an upside sealing ring sealably connected to the housing is arranged at an upper side of the upside through-hole, and a second through-hole connected through the upside through-hole is provided in the upside sealing ring; the optic fiber passes through the second through-hole and the upside through-hole and extends into the intracavity; a bottom of the optic fiber has an optic fiber end surface and the optic fiber is tightly jointed to the sealing ring at a section of the optic fiber passing through the second through-hole;

a left side of the housing is provided with an axial through-hole;

the displacement converting device comprises a measuring probe and a sliding block; wherein, the measuring probe is fixedly linked to the sliding block, is fitted in the axial through-hole, and extends out from the left side of the housing by passing through the axial through-hole; a left sealing ring sealably jointed with the housing is disposed at a left side of the axial through-hole; the measuring probe extends out from the left sealing ring arranged at the left side of the axial through-hole; a top surface of the sliding block is arranged with an inclined reflecting surface and the inclined reflecting surface is perpendicular to an axis of the optic fiber; a horizontal spring is disposed at a right side of the sliding block, a right sealing plug sealably connected to the housing is arranged at a right side of the housing, and the horizontal spring is disposed between the sliding block and the right sealing plug; the horizontal spring exerts left elastic force on the displacement converting device when the displacement converting device moves towards and presses against the horizontal spring.

2. The Fabry-Perot sensor according to claim 1, wherein the sliding block is a wedge and an inclined surface of the wedge forms the reflecting surface.

3. The Fabry-Perot sensor according to claim 2, wherein a displacement limiting block is disposed between the measuring probe and the sliding block, and a vertical size of the displacement limiting block is greater than that of the axial through-hole.

4. The Fabry-Perot sensor according to claim 3, wherein the right side of the sliding block is fixedly connected to a resistant block, the resistant block is tightly fit in the intracavity, and the horizontal spring is disposed at a right side of the resistant block.

5. The Fabry-Perot sensor according to claim 4, wherein a plurality of roll balls are uniformly arranged along the circumference of the axial through-hole; a first sliding slot in conjunction with the plurality of roll balls is disposed on a surface of the measuring probe.

6. The Fabry-Perot sensor according to claim 4, wherein the end surface of the optic fiber is perpendicular to the axis of the optic fiber and the reflecting surface is parallel to the end surface of the optic fiber.

7. The Fabry-Perot sensor according to claim 6, wherein the optic fiber includes a fiber Bragg grating and a distance from an end of the fiber Bragg grating to the end surface of the optic fiber is 1 to 3 millimeters.

* * * * *

UNITED STATES PATENT AND TRADEMARK OFFICE
CERTIFICATE OF CORRECTION

PATENT NO.        : 10,145,668 B2
APPLICATION NO.   : 15/342610
DATED             : December 4, 2018
INVENTOR(S)       : Yizheng Chen et al.

Page 1 of 1

It is certified that error appears in the above-identified patent and that said Letters Patent is hereby corrected as shown below:

On the Title Page

The (72) INVENTOR(S) should be read:
(--Yizheng Chen, Pendleton, SC (US); Yan Tang, Pendleton, SC (US); Yong Yuan, Shanghai (CN); Yongji Wu, Rolla, MO (US); Xian Liu, Shanghai (CN); Jie Huang, Rolla, MO (US); Jing Guo, Rolla, MO (US); Changlin Chen, Jilin (CN)--)

Signed and Sealed this
Sixteenth Day of April, 2019

Andrei Iancu
*Director of the United States Patent and Trademark Office*